(12) United States Patent
Gupta et al.

(10) Patent No.: US 9,621,566 B2
(45) Date of Patent: Apr. 11, 2017

(54) SYSTEM AND METHOD FOR DETECTING PHISHING WEBPAGES

(71) Applicant: Adi Labs, Inc, Markham (CA)

(72) Inventors: Deepak Srinivasa Gupta, Markham (CA); Syed Khairuzzaman Tanbeer, Scarborough (CA); Radesh Mohandas, Mulki (IN)

(73) Assignee: Adi Labs Incorporated (CA)

( * ) Notice: Subject to any disclaimer, the term of this patent is extended or adjusted under 35 U.S.C. 154(b) by 62 days.

(21) Appl. No.: 14/286,853

(22) Filed: May 23, 2014

(65) Prior Publication Data

US 2014/0359760 A1    Dec. 4, 2014

Related U.S. Application Data

(60) Provisional application No. 61/829,364, filed on May 31, 2013.

(51) Int. Cl.
　　*G06F 21/00*　　(2013.01)
　　*H04L 29/06*　　(2006.01)
　　*H04L 29/08*　　(2006.01)

(52) U.S. Cl.
　　CPC ...... *H04L 63/1408* (2013.01); *H04L 63/1483* (2013.01); *H04L 67/02* (2013.01)

(58) Field of Classification Search
　　CPC .................................................. H04L 63/1483
　　See application file for complete search history.

(56) References Cited

U.S. PATENT DOCUMENTS

| | | |
|---|---|---|
| 7,668,921 B2 | 2/2010 | Proux et al. |
| 7,802,298 B1 | 9/2010 | Hong et al. |
| 7,925,883 B2 | 4/2011 | Florencio et al. |
| 7,975,297 B2 | 7/2011 | Xavier et al. |

(Continued)

FOREIGN PATENT DOCUMENTS

| | | |
|---|---|---|
| EP | 1863240 | 8/1999 |
| WO | WO 2007/007988 | 3/2007 |

OTHER PUBLICATIONS

W. Zhuang et al, An Intelligent Anti-phishing Strategy Model for Phishing Website Detection, 2012 32nd International Conference on Distributed Computing.

(Continued)

*Primary Examiner* — Morshed Mehedi
(74) *Attorney, Agent, or Firm* — Baumgartner Patent Law; Marc Baumgartner

(57) ABSTRACT

A processor controlled hybrid method, an apparatus and a computer readable storage medium for identifying a phishing webpage are provided. The method comprises capturing overall visual information and overall structural information about a webpage being browsed by a user, comparing the overall visual information and overall structural information of the webpage with overall visual information and overall structural information of a legitimate webpage or a phishing webpage stored in a webpage database, calculating a measure of similarity, assessing the measure on the basis of a pre-determined threshold and concluding the measure of similarity is above the pre-determined threshold, thereby identifying a phishing webpage. The method may also provide for collecting and comparing visual information and, optionally, structural information.

19 Claims, 10 Drawing Sheets

(56) References Cited

U.S. PATENT DOCUMENTS

| | | | |
|---|---|---|---|
| 8,032,594 | B2 | 10/2011 | Helsper et al. |
| 8,175,387 | B1 | 5/2012 | Hsieh et al. |
| 8,381,292 | B1 | 2/2013 | Warner et al. |
| 8,433,141 | B2 | 4/2013 | Iofis |
| 8,701,172 | B2* | 4/2014 | Sanders ............... G06F 21/36 713/189 |
| 8,850,308 | B1* | 9/2014 | Roselander ...... G06Q 10/06398 705/7.38 |
| 2003/0101203 | A1* | 5/2003 | Chen ................. G06F 17/3089 715/234 |
| 2005/0091524 | A1 | 4/2005 | Abe et al. |
| 2005/0182970 | A1 | 8/2005 | Yasaki |
| 2006/0075028 | A1 | 4/2006 | Zager et al. |
| 2006/0080735 | A1 | 4/2006 | Brinson et al. |
| 2006/0095955 | A1 | 5/2006 | Vong |
| 2006/0156385 | A1* | 7/2006 | Chiviendacz ........... G06F 21/36 726/2 |
| 2006/0272017 | A1 | 11/2006 | Largman et al. |
| 2006/0294587 | A1 | 12/2006 | Bowden et al. |
| 2007/0039038 | A1 | 2/2007 | Goodman et al. |
| 2007/0094727 | A1 | 4/2007 | Singh |
| 2007/0118528 | A1 | 5/2007 | Choi et al. |
| 2007/0136806 | A1 | 6/2007 | Berman |
| 2007/0192855 | A1 | 8/2007 | Hulten et al. |
| 2007/0199054 | A1 | 8/2007 | Florencio et al. |
| 2008/0028444 | A1 | 1/2008 | Loesch et al. |
| 2008/0034428 | A1 | 2/2008 | Bejar et al. |
| 2008/0034432 | A1 | 2/2008 | Bohannon et al. |
| 2008/0115214 | A1 | 5/2008 | Rowley |
| 2008/0163369 | A1 | 7/2008 | Chang et al. |
| 2008/0276315 | A1 | 11/2008 | Shuster |
| 2009/0006861 | A1 | 1/2009 | Bemmel |
| 2009/0064325 | A1 | 3/2009 | Ford et al. |
| 2009/0070872 | A1 | 3/2009 | Cowings et al. |
| 2010/0042687 | A1 | 2/2010 | Wang |
| 2010/0083383 | A1 | 4/2010 | Adler et al. |
| 2010/0095375 | A1* | 4/2010 | Krishnamurthy . G06F 17/30864 726/22 |
| 2010/0251380 | A1 | 9/2010 | Zhang et al. |
| 2011/0083182 | A1 | 4/2011 | Emdee |
| 2012/0124514 | A1* | 5/2012 | Yuniardi ................ G06F 3/048 715/802 |
| 2012/0272330 | A1 | 10/2012 | Soghoian et al. |
| 2012/0278885 | A1* | 11/2012 | Hira ..................... G06F 21/645 726/22 |
| 2013/0036468 | A1 | 2/2013 | Georgiev |

OTHER PUBLICATIONS

Systems Workshops, pp. 51-56, 2012.
G. Xiang et al Cantina+: A Feature-Rich Machine Learning Framework for Detecting Phishing Web Sites.
ACM Trans. Inf. Syst. Secur., 14(2), Article 21, 2011.
J.M. Kang et al Advanced White List Approach for Preventing Access to Phishing Sites.
2007 International Conference on Convergence Information Technology, pp. 291-496, 2007.
Y.-G. Kim et al Method for Evaluating the Security Risk of a Website Against Phishing Attacks, ISI 2008 Workshops, LNCS 5075, pp. 21-31,2008.
McAfee Corp. SiteAdvisor[EB/OL]. http://www.siteadvisor.com/.
E. Medvet et al Visual-Similarity-Based Phishing Detection, Proceedings of the 4th International conference on Security and privacy in communication networks (SecureComm '08), Article No. 22, 2008.
L. Wenyin et al Detection of Phishing Webpages based on Visual Similarity, WWW, pp. 1060-1061, 2005.
T.-C. Chen et al Detecting Visually Similar Web Pages: Application to Phishing Detection , ACM Transactions on Internet Technology, vol. 10, No. 2, Article 5, 2010.
P. Prakash et al PhishNet: Predictive Blacklisting to Detect Phishing Attacks, IEEE INFOCOM, 2010.
K. Oberoi et al an Anti-Phishing Application for the End User, Proceedings of the 3rd Hackers' Workshop on Computer and Internet Security (Hack.in 2009), pp. 17-23 2009.
W.D. Yu et al PhishCatch—A Phishing Detection Tool, the 33rd Annual IEEE International Computer Software and Applications Conference, pp. 451-456, 2009.
Anti-Phishing Working Group, at http://www.antiphishing.org, last accessed May 3, 2013.
Google Instant Preview, available at http://support.google.com/webmasters/bin/answer.py?hl=en&answer=1062498, last accessed on May 8, 2013.
Google Pagerank, available at http://www.webworkshop.net/pagerank.html, last accessed on Apr. 25, 2013.
Google Safe Browsing, available at https://developers.google.com/safe-browsing/, last accessed on Apr. 2, 2013.
Microsoft SmartScreen, available at http://windows.microsoft.com/en-CA/internet-explorer/products/ie-9/features/smartscreen-filter, last accessed Apr. 10, 2013.
[17] Yahoo Sign-in Seal, available at https://protect.login.yahoo.com, last accessed on Apr. 2, 2013.

* cited by examiner

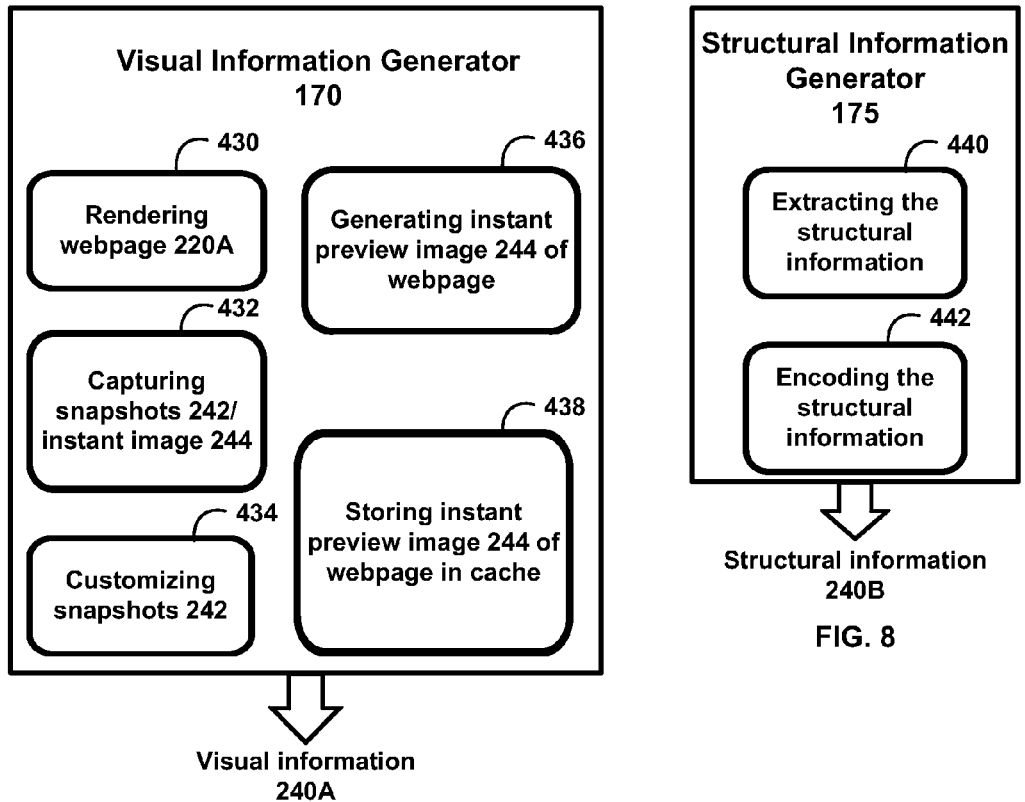
FIG. 7
FIG. 8
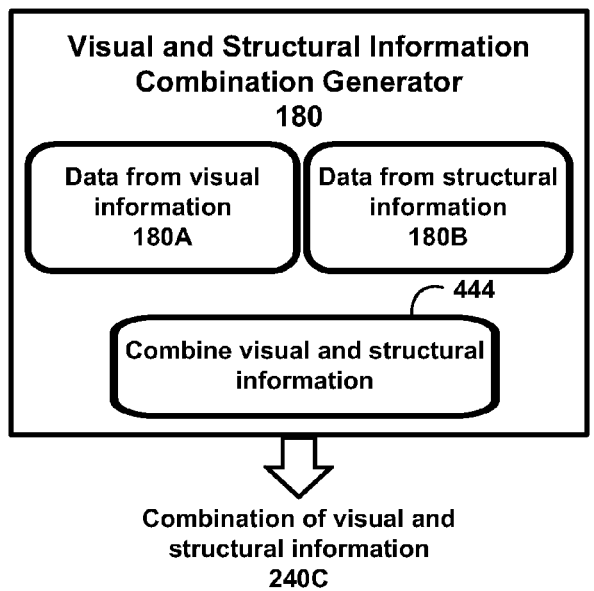
FIG. 9

SYSTEM AND METHOD FOR DETECTING PHISHING WEBPAGES

CROSS REFERENCE TO RELATED APPLICATIONS

This application claims benefit of U.S. Provisional Patent Application Ser. No. 61/829,364, filed on May 31, 2013, entitled SYSTEM AND METHOD FOR DETECTING PHISHING WEBPAGES, the contents of which are incorporated herein by reference in their entirety.

FIELD

The present technology relates to a method and apparatus for protecting computer system user's data against phishing, a technique that fraudulently obtains user personal data from a computer use. More specifically, the technology utilizes a hybrid system and method for alerting a user to phishing attackers.

BACKGROUND

As the use of Internet technology increases, computer-based fraudulent, malicious attacks have increased. Phishing, an effort to trick an Internet user to get his or her personal information through a fraudulent webpage, is an example of such a malicious attack. The information typically targeted by a phishing attacker includes a user's login information and personal data (e.g., login identification (ID) and password, credit card details, and personal account information).

A fraudulent webpage is a look alike of a well-known site. Anybody can host a site on the Internet or buy a domain name or an SSL (Secure Sockets Layer) certificate with little or no verification. Though there are rules against fraudulent uses of these privileges, criminals continue to abuse the Internet. The time and effort to take remedial action against these scammers take considerable resources. This problem is compounded by the fact that many of these sites are hosted across international boundaries where the legal systems are different or ineffective.

Phishing attackers use various approaches to direct traffic to the fraudulent webpage. For example, they may distribute legitimate-looking emails by the millions ("spam"). Some use social engineering techniques. Though savvy users can easily identify such emails, a portion of novice users are victimized.

The most common technique used by phishing attackers is to capture user traffic. Here the phishing attackers team up with cybercriminals and release malware that interferes with DNS (domain name system) discovery or browser settings and data of the unsuspecting customers to redirect traffic to their fraudulent site. As new software keeps hitting the markets, new vulnerabilities are found on a regular basis and there is always a lag before the vulnerable systems are patched.

Typosquatting or uniform resource locator (URL) hijacking is another type of tricking technique phishing attackers often follow. Scammers host their site on domains that spell like the original and then rely on a typo from an unsuspecting user to score a hit. Again, by manipulating the search engine rankings, a phishing site may get indexed on search engines and then have traffic sent to them. The attacker can also use Internet advertisements that forge the logos or other servicemarks or trademarks of legitimate businesses and have a target link to their phishing host. Often, the advertisements use social engineering techniques such as offering a cash bank or such incentive to the user for clicking the link.

Financial institutions and e-commerce websites are the usual targets for these phishing attackers. From these websites, the criminals can quickly transfer funds or purchase goods using stolen accounts before getting traced. Hence, it is in the best interest of these legitimate businesses to quickly find the phishing hosts and take them down.

There are various available solutions to protect against phishing. For example, constantly scanning and filtering spam emails may reduce the chance of phishing attacks. Also, keeping the filtering rules up to date is important to keep the filtering work successful.

Other techniques focus on identifying phishing webpages by looking into different parameters such as URL and webpage content. The heuristic based models generally first identify the characteristics of the URL by using a single and/or set of heuristics generated on URL similarity calculation, domain name probability evaluation, number of the external links of the webpage, IP (Internet Protocol) address, and the port number. Metadata about the webpage, specifically ranking, registration information, and category are also obtained by the method by querying the third party libraries such as Whois and Google Pagerank.

The phishing webpages are then identified based on the comparison on heuristic results and metadata information between the suspected webpage and the legitimate webpage. Most of the methods in this category are based on a blacklist created by populating the already identified phishing webpages.

As an alternative heuristic method, the whitelist based methods prevent access to explicit phishing sites and warn for phishing suspicions by using URL similarity checks. The whitelist is prepared based on user visits to webpages where he or she previously submitted personal information. When the user accesses a webpage, the URL and IP information is passed to the module called Access Enforcement Facility (AEF) to check if the webpage is a phishing site or not. The AEF module provides the result by simply comparing the URL and IP of the webpage with the trusted webpages already stored in the whitelist.

The risk assessment based methods quantitatively analyze the security risk of a webpage and evaluate the security risk of the webpage against the phishing attacks. The security risk is calculated through a number of steps: definition of the risk elements; weight between risk elements; measurement of the risk grade; calculation of the total security index; calculation of the max security index; and calculation of the webpage security risk index.

The other broad category of phishing detectors is the content-based methods. The webpage content-based methods primarily extract a variety of page elements (such as keywords, description, copyright information, frame URLs, image URLs, and corresponding texts of these links) as features, and use different machine learning tools (e.g., classifiers) to detect phishing attacks. These methods primarily use heterogeneous feature classifiers to classify features, and then with the use of suitable (ensemble) learning methods, train the phishing detector to identify phishing attacks.

Based on the assumption that a phishing webpage aims to mimic the appearance of the targeted page (i.e., legitimate page), there are some approaches that focus on identifying phishing webpages based on visual similarity. Most of the visual similarity based phishing detecting methods divide the webpages into different parts and then compare the visual similarity between each pair of parts in the legitimate and suspected webpages. For example, a visual similarity based phishing detecting method can measure the visual similarity between two webpages in three aspects such as block level similarity, layout level similarity, and overall style similarity. In the block level it considers the texts and images in the webpage and extracts features for all blocks in the webpage. The weighted average of visual similarities of all matched block pairs between two pages are calculated and taken into consideration for similarity identification. The layout similarity identifies the deviation of similarity in the layout between two webpages. The layout similarity of two webpages is defined as the ratio of the weighted number of matched blocks to the total number of blocks in the true webpage. The overall style similarity mainly focuses on the visual style of the webpage including the font family, background colour, text alignment, and line spacing. The overall system uses the same technique of feature extraction and classification to detect phishing webpages. In another visual similarity based approach, the method quantifies each text element based on a 6-value tuple such as textual content, foreground colour, background color, font size, name of the corresponding font family, and the position in the page, and each image is quantified based on a 5-value tuple source attribute, dimension, colour histogram, 2D Haar wavelet transformation, and position in the page. Then, the visual similarity matching process is executed to identify visual similarity among similar aspects or tuples between two webpages. Among other approaches, human interactive proof methods are based on human recognition of images in detecting phishing webpages. For all of the above visual similarity based approaches, identifying the aspects and/or components for the visual similarity checking, and executing the similarity checking methods for a large number of such aspects and/or components between two webpages in time-efficient manner have been the major challenges.

There is a need for systems and methods that uses the overall structural information or overall visual information or both of the webpages to detect phishing. Such systems and methods would overcome the challenges of the existing visual similarity and content based phishing detecting methods.

SUMMARY

The present technology is directed to systems and methods that utilize overall visual or structural information to identify phishing webpages or that utilize both visual and structural information in combination to identify phishing webpages.

The systems and methods disclosed herein also can learn about the webpages the user browses in the Internet by reading the user's browser data. Snapshots of all such webpages can be created based on these data and stored in a local database. When the user browses webpages in the Internet, the systems and methods also monitor the webpages in the background and run the heuristics on each relevant page. If a positive match is identified, the system can warn the user intuitively and block the webpage for the user. This system can detect the newly surfaced zero day phishing hosts which are not yet reported on the voting systems and community databases.

The technology can be implemented in both single user computing device and in the server computing devices of Internet service providers, hosting services, domain name registration services and certificate agencies. This implementation may allow them to quickly detect malicious hosts on their networks and execute their ethical responsibilities and reduce their legal consequences.

The overall phishing detection mechanism, according to this technology, may have two different modules: "capturing originals" and "detecting phishing", which may run independently and in parallel. The capturing original module primarily may be responsible for gathering technical information about legitimate webpages which will be maintained in a database. A variety of means such as crawling the Internet and communicating with legitimate sources to capture information about legitimate webpages can be used.

In the phishing detection module, the system may capture information about the webpage and use it in detecting phishing according to the present technology. The result is also presented to user when the detection process is complete.

In one embodiment, a processor controlled hybrid method for identifying a phishing webpage is provided. The method comprises:

capturing overall visual information and overall structural information about a webpage being browsed by a user;

comparing the overall visual information and the overall structural information of the webpage with overall visual information and overall structural information of a legitimate webpage or a phishing webpage stored in a webpage database;

calculating a measure of similarity;

assessing the measure on the basis of a pre-determined threshold; and concluding the measure of similarity is above the pre-determined threshold, thereby identifying a phishing webpage.

The method may further comprise scanning a priority list.

The method may further comprise compiling, storing and updating the webpage database.

The method may further comprise compiling, storing and updating the priority list.

Capturing overall visual information may comprise:

rendering the webpage with a pre-defined fixed resolution to provide a rendered webpage;

customizing the rendered webpage into a pre-defined fixed format to provide a customized webpage; and taking a snapshot of the customized webpage.

Capturing overall structural information may comprise extracting a source code of the webpage to provide an extracted source code.

The method may further comprise representing the extracted source code in as a scalar or a vector or a combination thereof.

The method may comprise generating a combination of visual and structural information.

The method may further comprise alerting the user of the phishing webpage.

The method may further comprise instructing a blocking or removing module to block or remove the phishing webpage.

In another embodiment, a processor driven method of protecting a user browsing a webpage from a phishing webpage is provided. The method comprises:

developing and maintaining a webpage database, the webpage database comprising at least one of legitimate webpages, suspect webpages and phishing webpages;

capturing visual information and structural information about the webpage being browsed by the user;

comparing the visual information and the structural information of the webpage with visual information and structural information of the webpages in the webpage database;
calculating a measure of similarity;
assessing the measure on the basis of a pre-determined threshold;
concluding the measure of similarity is above the pre-determined threshold; and
instructing a module to block the phishing webpage or alert the user to the phishing webpage, thereby protecting the user from the phishing webpage.

The developing and maintaining the webpage database may comprise:
automatically scanning the Internet for webpages;
capturing visual information and structural information about the webpages; and
storing the information about the webpages in the webpage database.

The information may include snapshots of the webpages.

The method may further comprise hashing an at least one snapshot.

The method may further comprise: prioritizing a set of hosts in the Internet to provide a priority list.

The prioritizing may be based on user-defined criteria, age of the host, or programme-defined criteria.

The method may further comprise:
tagging a visited webpage with a unique identifier; and
storing the unique identifier in the webpage database.

The unique identifier may be contained within an e-mail or within a cache of a web browser.

The information may be overall structural and overall visual information.

In another embodiment, an apparatus for identifying a phishing webpage is provided. The apparatus comprises a user interface, at least one processor and at least one memory including computer programme code,
the memory configured to store a webpage database,
the at least one processor and the computer programme code configured to:
capture visual information and, optionally structural information about a webpage being browsed on the user interface, wherein capturing visual information comprises:
rendering the webpage with a pre-defined fixed resolution to provide a rendered webpage;
customizing the rendered webpage into a pre-defined fixed format to provide a customized webpage; and
taking a snapshot of the customized webpage;
compare the visual information and, optionally structural information of the webpage with visual information and, optionally structural information of a webpage stored in the webpage database;
calculate a measure of similarity;
assess the measure on the basis of a pre-determined threshold;
conclude the measure of similarity is above the pre-determined threshold; and identify the phishing webpage.

The at least one processor and the computer programme code may be configured to:
capture both visual information and structural information about a webpage being browsed on the user interface; and
compare the visual information and structural information of the webpage with the visual information and structural information of a webpage stored in the webpage database.

The at least one processor and the programme code may be configured to instruct a module to block the phishing webpage or alert the user to the phishing webpage.

The at least one processor and the programme code may be configured to prioritize a set of hosts in the Internet to provide a priority list.

In another embodiment, a computer-readable storage medium for executing by a processor is provided. The storage medium comprises one or more instructions to:
capture visual information and, optionally, structural information about a webpage being browsed on the user interface;
compare the visual information and, optionally, structural information of the webpage with at least one of visual information and, optionally structural information of a webpage stored in the webpage database wherein capturing visual information comprises:
rendering the webpage with a pre-defined fixed resolution to provide a rendered webpage;
customizing the rendered webpage into a pre-defined fixed format to provide a customized webpage; and
taking a snapshot of the customized webpage;
calculate a measure of similarity;
assess the measure on the basis of a pre-determined threshold; and
conclude the measure of similarity is above the pre-determined threshold; and
identify the phishing webpage.

The computer-readable storage medium may further comprise one or more instructions to instruct a module to block the phishing webpage or alert the user to the phishing webpage.

The computer-readable storage medium may further comprise one or more instructions to prioritize a set of hosts in the Internet to provide a priority list.

BRIEF DESCRIPTION OF THE DRAWINGS

The technology described herein is illustrated by way of examples and processing modules, and not by way of limitations in the accompanying figures. For simplicity and clarity of illustrations, elements illustrated in the figures are not necessarily drawn to scale. For example, the dimensions of some elements may be exaggerated relative to other elements for clarity. Moreover, where considered appropriate, reference labels have been repeated among the figures to indicate corresponding or analogous elements. Figures illustrate non-limiting embodiments of the technology:

FIG. 7, FIG. 8, and FIG. 9 show how the visual information, structural information, and combination of both information about a webpage are generated, according to the present technology.

DESCRIPTION

The embodiments described herein address the problems and solution of potential phishing attack while using computing devices. The following description is intended to convey a thorough understanding on numerous specific details of the technology, involving systems and methods for implementing the anti-phishing based solutions. In other instances, well known terms, process steps and/or structures have not been described and/or exemplified in detail in order to not unnecessarily obscure the present technology. It should be appreciated, however, to one skilled in the art, that the present technology is not limited to these specific embodiments and details, and may be practiced without some or all of these specific details.

As used in this application, the terminologies "method", "component", "module", "system" and the like are intended to refer to a computer-related entities, such as hardware, software (for instance, in execution), and/or a combination of hardware and software (for instance, in execution). A component may refer to, for example, but are not limited to, a program, a process (or part of a process) running on a processor, an object, an executable, a thread of execution, and/or a computing device. A particular component may contain one or more components or the like.

Figure 1:
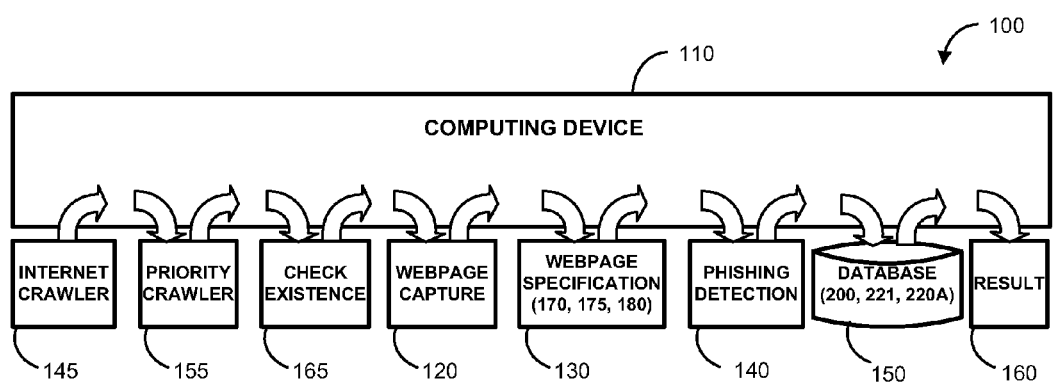
FIG. 1 shows the system of the present technology for detecting phishing webpages.

FIG. 1 illustrates a high-level exemplary block diagram of a phishing prevention system, generally referred to as 100 in which the embodiments of pre-processing mechanism of phishing identification, phishing prevention, and notification can be implemented. Alternatively or additionally, this phishing detection and prevention system 100 can be used to warn users for potential phishing attack and reinforce prudent computing practices.

The computing device 110 may be embodied in various forms such as, but not limited to a desktop computer system, laptop computer systems, any mobile computing and communicating devices (e.g., tablet computers or smartphones), server computer systems, a cluster of computer systems, or mainframe. As shown in FIG. 1, an Internet crawler 145 can crawl the Internet to obtain webpages. The webpage is captured by the webpage capture module 120, if the webpage is a new (i.e., not already found) webpage and the webpage then can be passed to a webpage processing module 130 to process the webpage information. A check existence module 165 is responsible to determine whether a webpage has already been found or not. The information is then passed to the phishing detection module 140. To make the Internet crawling process faster, a priority crawling module 155 is used.

The phishing detection module 140 extracts and stores information from and to a database 150 that maintains information about legitimate 200 and phishing 221, and suspected webpages 220A. Information on both legitimate webpages 200 and phishing webpages 221 is stored for future use when determining the legitimacy of the webpage. The phishing detection system 100 may also generate phishing detecting reports to a user 160. Also included in the system are a visual information generator 170, a structural information generator 175 and a combined information generator 180.

Figure 2:
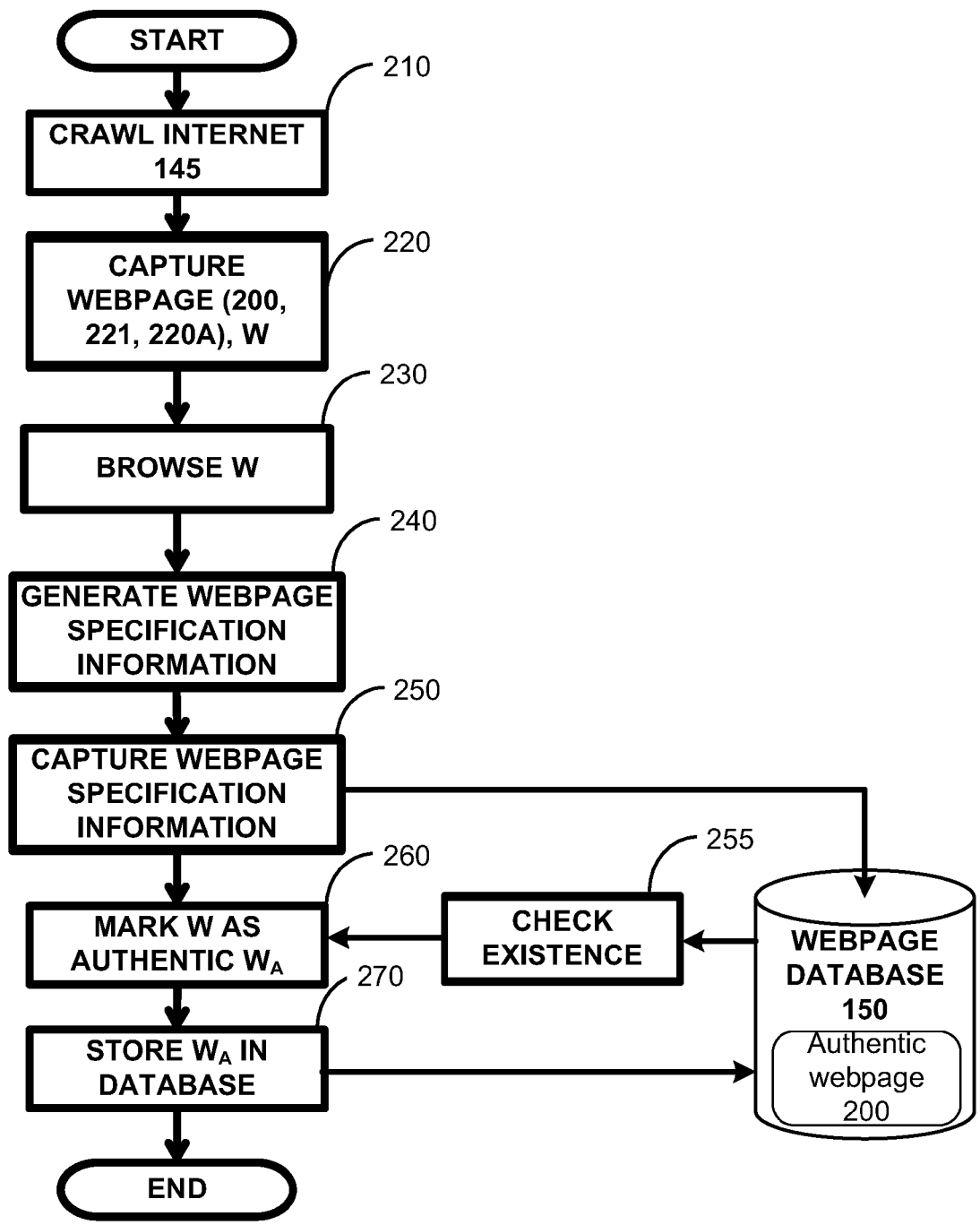
FIG. 2 is a flow diagram showing the basic method of capturing webpage information and storing it in a webpage database.

The basic flow diagram in FIG. 2 illustrates the initial steps of capturing legitimate webpages 200, phishing webpages 221 and suspected webpages 220A. The system 100 scans 210 the Internet by using the Internet crawler 145 to capture 220 webpages 200, 221, 220A. The webpage is browsed 230 using any web browser software 135 (see FIG. 3). After capturing 220 the webpage 200, 221, 220A, the system generates 240 webpage specific information for that webpage to be used for the next phishing detection method. The generated webpage specific information is then retained 250 in a specific form. The check existence module 165 checks 255 the existence of a found webpage 200, 221, 220A in the webpage database 150.

The webpage 200, 221, 220A is then labeled 260 and pertinent information about the webpage is stored 270 in a webpage database 150.

Figure 3:
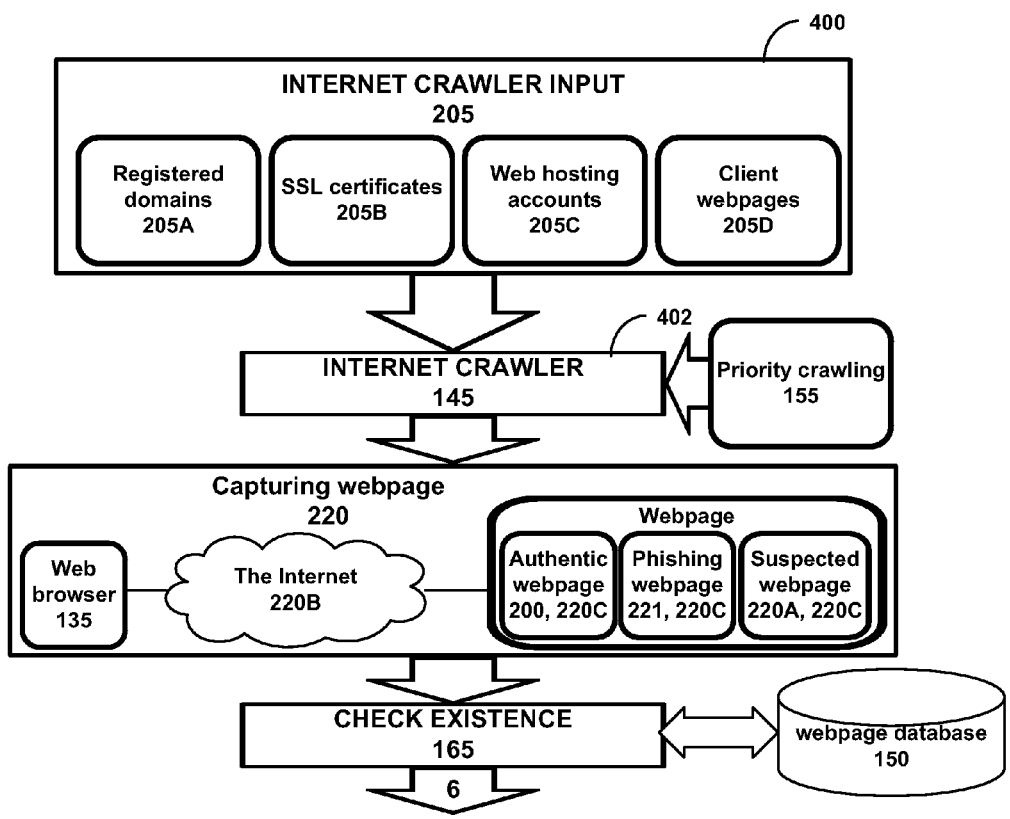
FIG. 3 is a block diagram showing in detail the stages of crawling the Internet, capturing webpage information and storing it in a webpage database, according to the present technology.

FIG. 3 details capturing a webpage 200, 221, 220A to process its content and structure information. The internet crawler 145 captures 400 legitimate information, generally referred to as 205, from registered domains 205A, already issued SSL certificates 205B, and web hosting accounts 205C. Hence, 205A, 205B, and 205C can be considered as the inputs of the Internet crawler 145 used in the system. In addition to these inputs 205A, 205B, 205C, the Internet crawler 145 may also get webpage information directly or indirectly from the original host organization 205D for the webpage. This information is associated with legitimate webpages 200. Information on all webpages 200, 221, 220A, is further collected as described below, where the method is applied to a suspect website 220A, by way of example.

Figure 4:
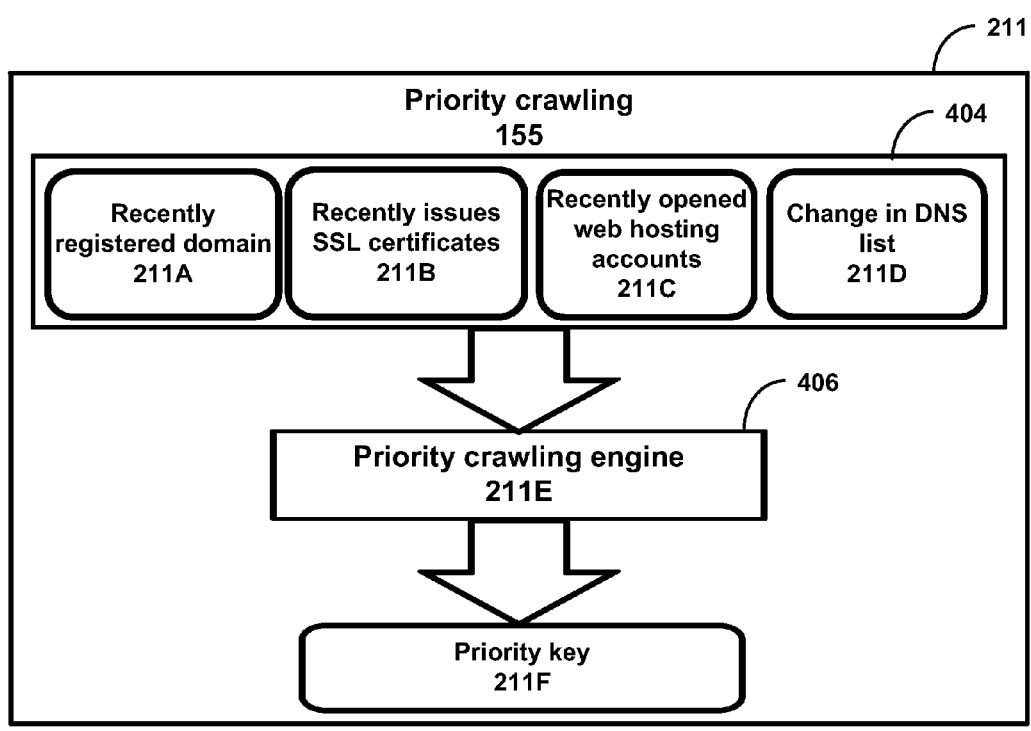
FIG. 4 is a block diagram of the operations of the priority crawling module.

As shown in FIG. 4, in order to cope with the vastness of the Internet and the rapid growth of the number of newly hosted webpages in the Internet, the Internet crawler 145 may use a constantly updated priority list of webpages, generally referred to as 211, to capture webpages. Returning to FIG. 3, the hosts in the priority list are scanned 402 more often than the complete scan of the Internet. Prioritizing can be performed based on any number of parameters, including, but not limited to user defined criteria, age of the host, or using an automatic programmatic approach.

As shown in FIG. 4, to update the priority list 211, recently registered domains 211A, recently issues SSL certificates 211B, and recently opened web hosting accounts 211C are primarily considered 404 as inputs of a priority crawling engine 211E, which is responsible for updating the priority list 211. Updating the priority list also includes identifying old entries in the list based on user-provided criteria or using an automatic programmatic approach and deleting such old entries from the list and using the partial information obtained by tracking the changes in DNS lists, wherever exact information is not available.

The recently opened web hosting accounts can be obtained from the finite set of web hosting account providers. The exemplary cases when this web hosting account information will not be available, the changes in DNS lists 211D can be tracked to infer about this information. The priority crawling engine 155 outputs 406 a priority key (priority number) 211F that is attached to the webpage to indicate the priority sequence of that webpage.

Any available webpage browser software 135 is used for finding the webpage 200, 220A identified by the Internet crawler 145 on the Internet 220B. Assuming that the webpage is not legitimate, further processing on the webpage 220A depends on the outcome of the check existence module 165. The check existence module 165 checks the existence of a found webpage 220A in the webpage database 150.

Figure 5:
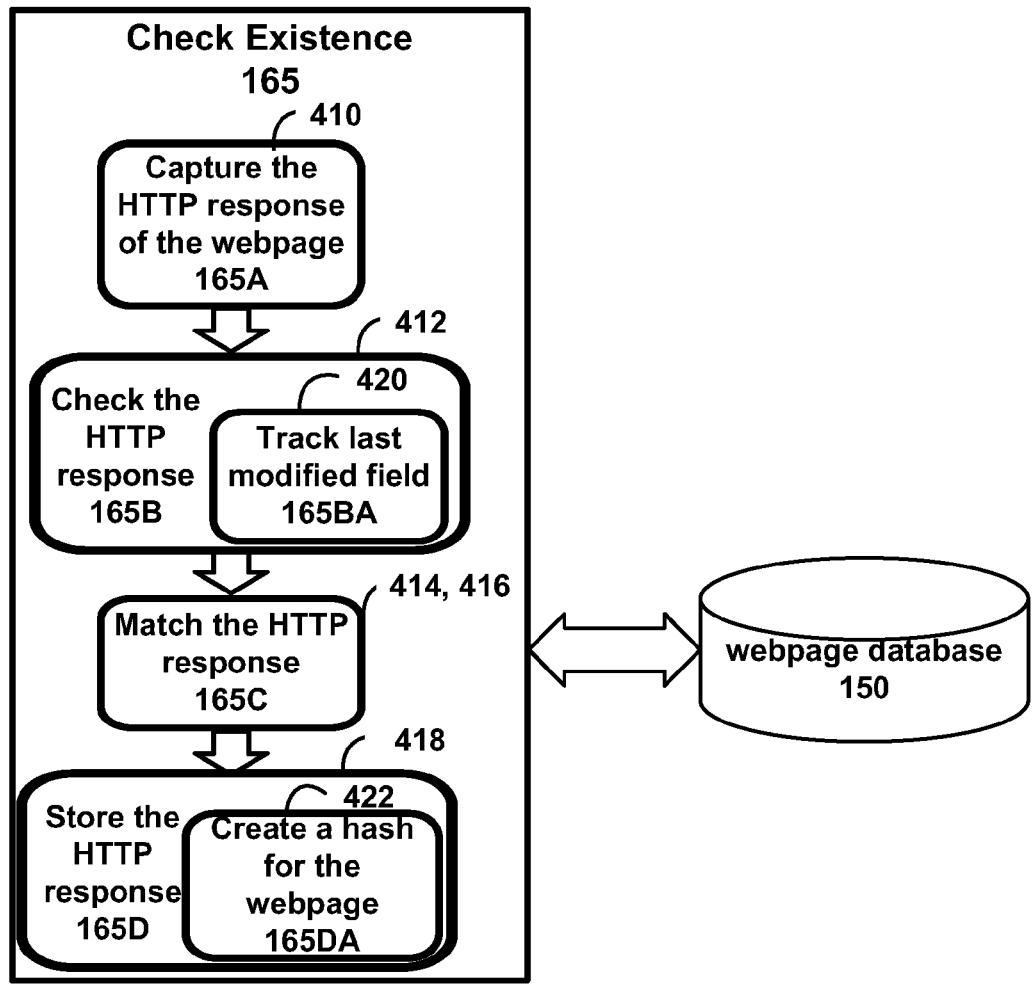
FIG. 5 is a block diagram of the operations of the check existence module.

As shown in FIG. 5, the check existence module 165 first captures 410 the HTTP (hypertext transfer protocol)

response 165A of the webpage 220A. Then it checks 412 this response 165B for its completeness, and at the last step the method searches 414 the database 150 to identify 416 any match of the HTTP response of the webpage 220A with HTTP responses of existing webpages stored in the database 150. The webpage 220A is considered as a new webpage, if the check existence module 165 reports a negative result. The HTTP response of this webpage 220A is then stored 418 in the webpage database 150 for the reference for the future check existence operations.

To make the operation of the check existence method faster, the implementation of the method may further be incorporated with tracking 420 on the last modified field of the HTTP response 165A for the webpage 220A and also creating 422 a hash 165DA of the webpage captured 400 during the previous visit of the Internet crawler 145. This further implementation may help skip comparing the webpage 220A with both the legitimate webpages 200 and the phishing webpages 221 stored in webpage database 150, if the webpage 220A has not changed since the previous visit.

Figure 6:
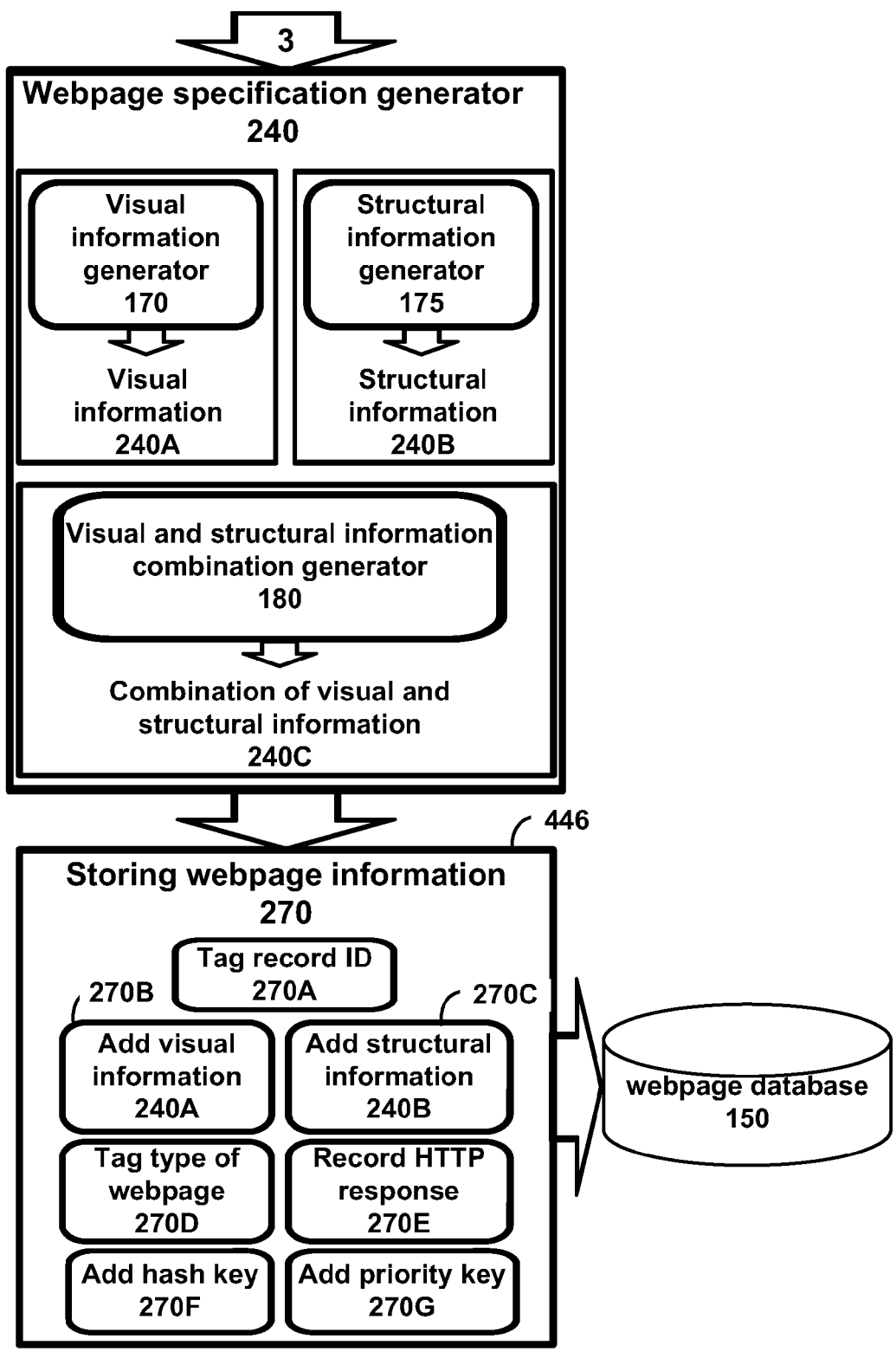
FIG. 6 is a block diagram of the details of the operations of the webpage specification information generator. This figure further shows a block diagram of storing information received from the webpage specification information generator.

FIG. 6 illustrates the further steps of generating webpage information. Once a webpage 220A is found as new, the system generates visual information 240A, structural 240B and combined information 240C, collectively referred to as webpage information, using a webpage specification information generator 240, which includes the visual information generator 170, the structural information generator 175 and the combined information generator 180. As shown in FIG. 7, the first step in generating visual information 240A is rendering 430 the webpage 220A in the visual information generator 170 into a pre-defined fixed format. The generator 170 then captures 432 repeated snapshot images 242 of the webpage 220A and customizes 434 them with pre-defined resolutions and/or image sizes. It is the overall visual information that is collected.

Capturing 432 an instant preview image 244 of the webpage 220A, which is an image of the webpage 220A with low-resolution and reduced image size, as used by Google Instant Preview, is also performed as part of generating visual information 240A. The instant preview image 244 can be stored 438 in available cache of the computing device 110 for a faster preliminary processing of image comparison while detecting phishing.

Structural information 240B is generated using the structural information generator 175 as shown in FIG. 8. Because most webpages are developed using some variants of HTML (hypertext markup language) structured language, the main goal is extracting 440 structural information 240B of the webpage 220A by exploiting its HTML structure format or other source code. The structure information 240B is then encoded 442 in scalar or vector forms or a combination of the two. This encoding mechanism 442 follows a predefined fixed encoding technique for all webpages 200, 221, 220A the system processes. It is the overall structural information that is collected. An additional or alternate implementation of 240B focuses not solely on HTML webpages but on XML (extensible markup language) webpages 220C.

Either of the above visual information 240A and structural information 240B can be independently used as the webpage specific information. In addition, once a webpage 200, 221, 220A, 220C is found as new, the structural and visual information can be analyzed separately, but the outcomes can be combined to represent a hybrid of the data from the visual information 240A and data from the structural information 240B. The combined information generator 180 combines both techniques of visual information generator 170 and structural information generator 175 of the same webpage 200, 221, 220A, 220C. This combined information 240C can be used as another alternative to generate webpage specific information. The implementation of this combined approach 444 can be practiced to improve accuracy and optimize the computing efforts.

Returning to FIG. 6, the webpage specific information is then stored 446 in the webpage database 150. Each record in the database 150 represents for each distinct webpage 200, 221, 220A, 220C where each record consists of a tag record ID 270A, a unique identifier for the webpage 200, 221, 220A, 220C, the visual information 270B, the visual information 240A generated by the visual information generator 170; the structural information 270C, the structural information 240B generated by the structural information generator 175; the type of the tag 270D of the webpage 200, 221, 220A, 220C; the HTTP response 270E of the webpage 200, 221, 220A, 220C; a hash key 270F; and the priority key 270G for the webpage 200, 221, 220A, 220C.

Figure 10:
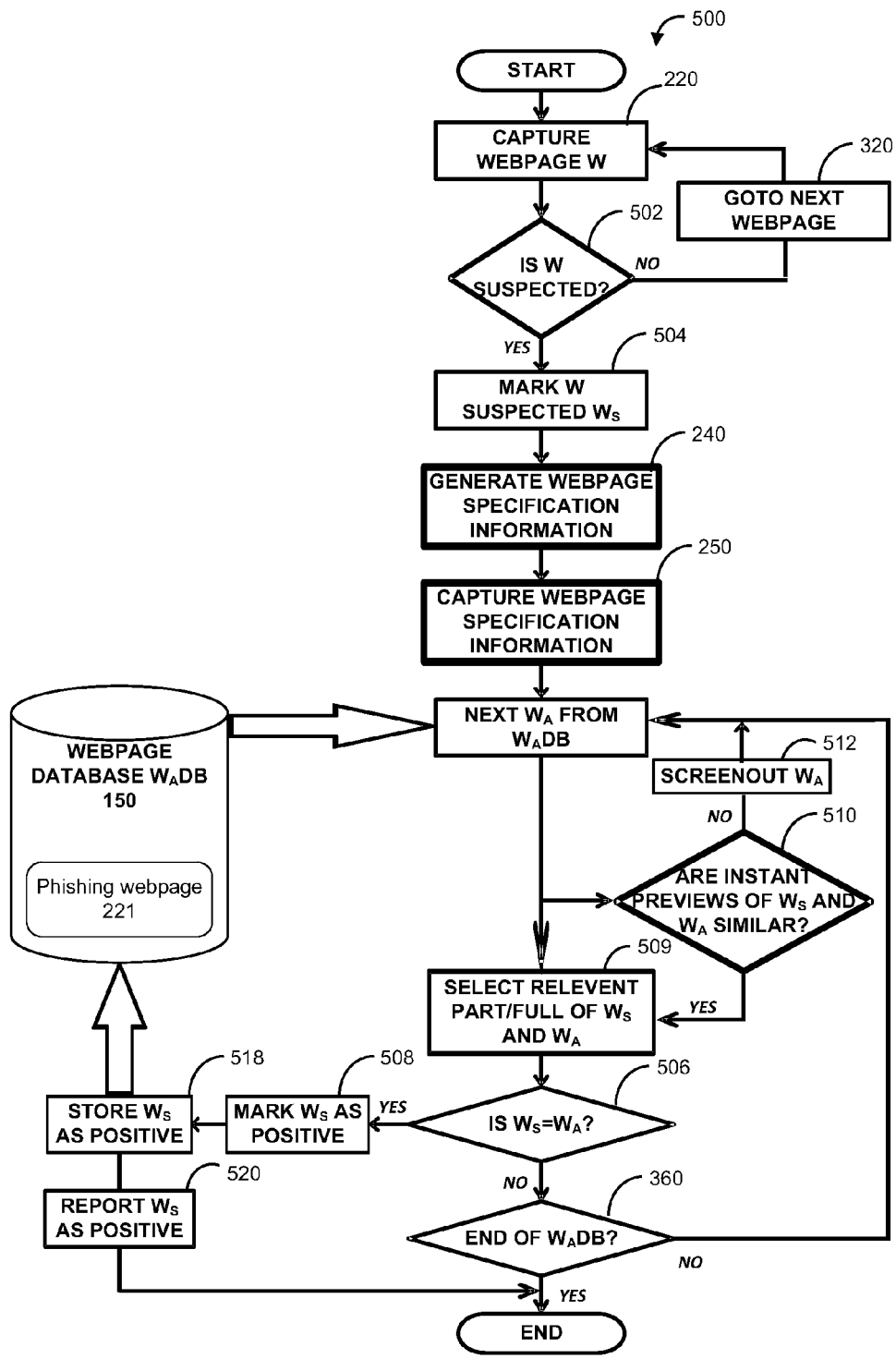
FIG. 10 is a flowchart illustrating the process of detecting phishing using the present technology.

The phishing detection module is further divided into two main methods: capturing the suspected webpage information and phishing identification. FIG. 10 illustrates the basic flow diagram of the capturing, and detecting phishing method generally referred to as 500. The method starts with capturing 220 the webpages 220C. If the webpage 220C is suspected 502 by the user, the method marks 504 it as a suspected webpage 220A. Otherwise, the method proceeds to capturing 220 the next webpage 320 for possible phishing identification by repeating the same procedure. For each suspected webpage 220A, the method of FIG. 6 is invoked to generate webpage specification information and webpage specific information about the suspected webpage 220A is captured 220. The phishing detection module then continues to the phishing identification method.

The method starts with comparing 506 the webpage specific information for the suspected webpage 220A generated by 240 and captured 250 with the records of legitimate and phishing webpage 200, 221 specific information stored 340 in webpage database 150. This comparison is conducted by measuring the differences between related parameters of both the suspected webpage 220A and the records of legitimate and phishing webpage 200, 221. As an example, the visual information 240A of the suspected webpage 220A and that of the records of legitimate and phishing webpage 200, 221 are compared and similarly, the structural information 240B of the suspected webpage 220A is compared with that of the records of legitimate and phishing webpage 200, 221. As part of the comparison, visual measures, and similarly, structural measures are calculated for the visual information and the structural information, respectively. This is followed by computing the difference between the visual measures and computing the differences between the structural measures, respectively. Based on this calculation, records having less similarity, computed using a pre-determined user-specified or programme-specified similarity threshold, can be screened out 512.

The suspected webpage 220A is marked 508 as positive phishing webpage, if there is no difference for all or some measures of these comparisons between the visual 240A and/or structural information 240B of the suspected webpage 220A and that of the records of legitimate 200 and phishing webpages 221. The comparing 506 between different parameters of the suspected webpage 220A and the record (legitimate webpage 200) may also be implemented by customizing the representation logic by selecting 509 only those parts of the webpage 220A in the snapshots that may seem relevant to comparison purposes. The actual details of the structural representation and the weights and measure of allowable difference may also be fine tuned by performing further measurement.

The comparing 506 the visual information 240A between different parameters of the suspected webpage 220A and the record (legitimate webpage 200) may also be implemented by using the instant preview image 244 of the record. A multi-level comparison scheme can be adopted to reduce the overall comparison cost and make the overall comparison process faster. In the first level, a quick comparison 510 can be performed between instant previews 244 of the webpage 220A and the record. Based on this comparison between two visual measures of two visual information, records having less similarity, computed using a user-specified or programme-specified similarity threshold, can be screened out 512. If the record is not screened out i.e. they are identical or there is a partial match, the next level of visual information comparison is performed. This level may include comparing the visual information between the webpage 220A and the record in detail to find the match between them based on the user-specified or programme-specified threshold for this level.

Once the suspected webpage 220A is identified (marked) 508 as a positive phishing webpages, the system stores 518 this webpage and its already extracted information in the webpage database 150. An identifier for the webpage can be provided in an email or in the web browser cache. The system also generates 520 phishing positive report 380 for that suspected webpage. If the comparison 350 provides no or very little match between the suspected webpage 220A and the record, the webpage is not considered as a phishing webpage and the system processes for the next available suspected webpage 220A.

Figure 11:
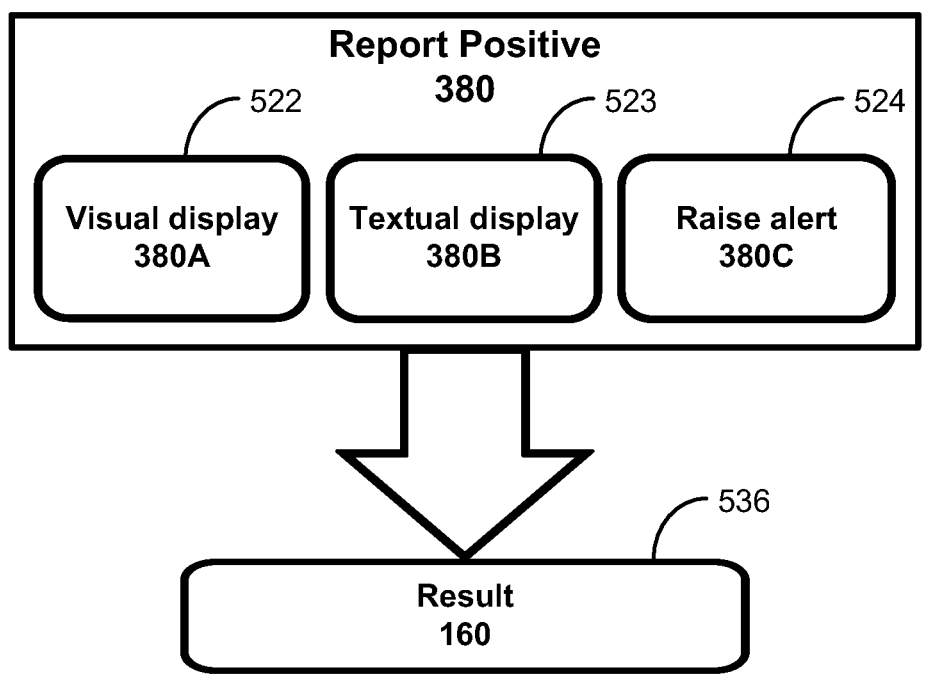
FIG. 11 illustrates the method of reporting the phishing detection result to user using the present technology.

The report positive 380 of the method may include a series of actions that can be taken by the system depending on user preferences. FIG. 11 illustrates a system block diagram of a phishing reporting system. The phishing report system can be used to display 522 visual 380A information and display 523 textual 380B information to display terminals as a warning. The phishing reporting system may also include raising 524 alert 380C sound from any audio output device attached to the computing device 110.

The phishing reporting system 380 may also include the execution of other user requested actions. For example, the phishing reporting system may remove 536 the phishing webpage whenever a phishing webpage is detected for an original webpage.

Figure 12:
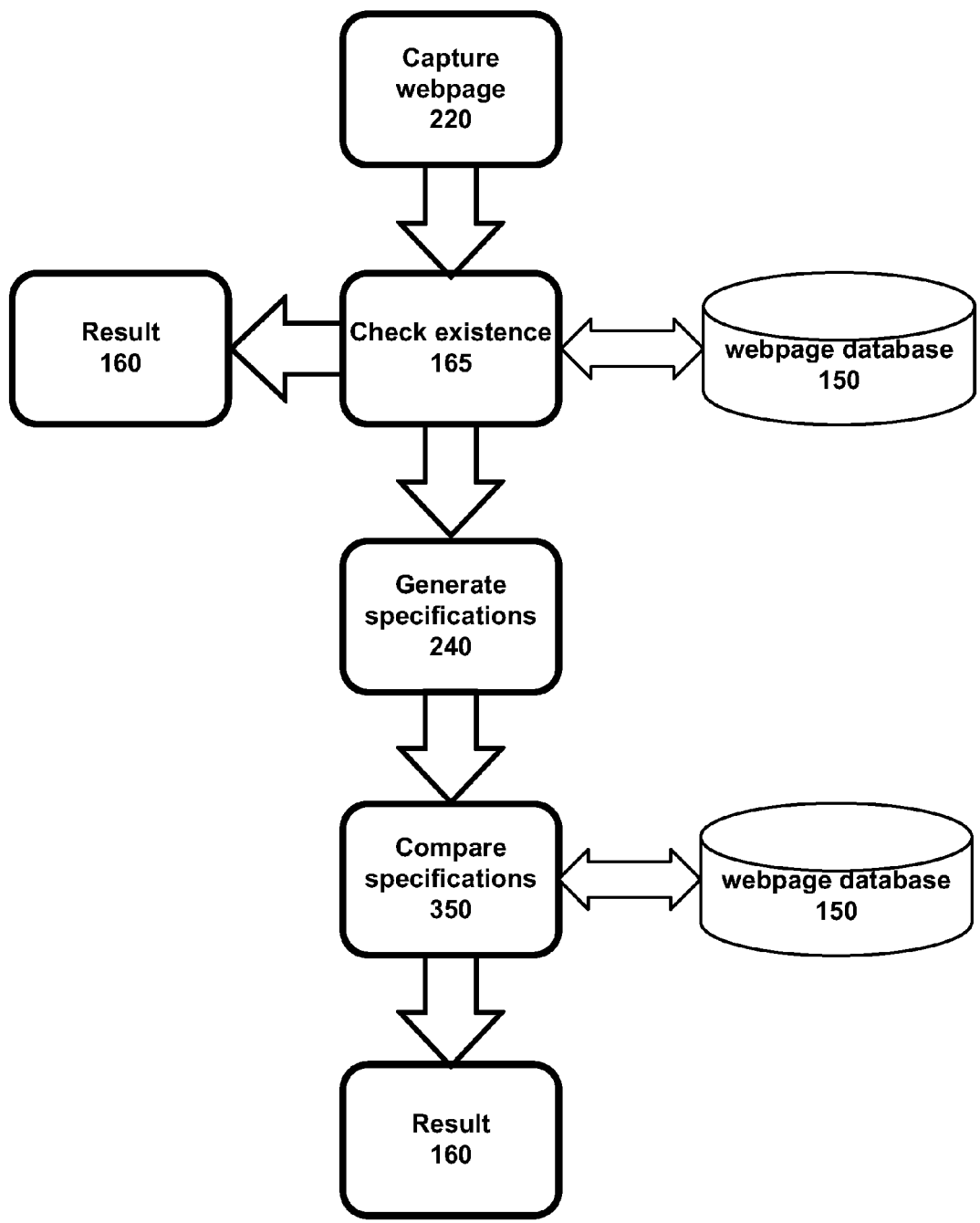
FIG. 12 is a diagram sketching the overall phishing detection mechanism, according to the present technology.

FIG. 12 illustrates the basic steps in the overall phishing detection system.

The embodiment of the phishing detection system can also be implemented to monitor the pages visited by the user and run the phishing detection modules on each relevant page in the background. When a positive match is found, a report can be generated to warn the user intrusively and block the site, if any webpage blocking module such as firewall is in effect with the computing device 110.

Depending on the user service requirement, the technology can be implemented in different environments such as browser software 135, any anti-virus software installed in the computing device 110, any active firewall operating with the computing device 110, and the computing device 110. The real-time phishing detection can be performed by keeping the system enabled.

By way of example, suitable exemplary methods are outlined as follows:

Example 1

Bob, a customer of ABCD Bank, uses the phishing detection method (PDM) of the present technology in his computer. The PDM learns about the ABCD Bank's webpage (i.e. W) by reading Bob's browser data and/or by crawling the Internet. The capturing authentic webpage information module of the PDM captures the visual and structural information of W. Roughly, the visual information could be the snapshots of W, and/or low-resolution instant preview image of W, and the structural information could be the HTML/XML structure information of W. The captured visual and structural information about W is stored in a webpage database.

When Bob browses the Internet, the PDM monitors the visited pages in the background and runs the heuristics (of matching visual and/or structural information between pages) on each relevant page. Thus, when Bob attempts to open and/or browse a phishing webpage (i.e. P) of W, the PDM finds positive match and warns Bob intrusively and blocks the site in the firewall (depending on setup). This phishing webpage can be identified immediately before Bob provides any personal information (e.g., username/account no and password) to P.

Example 2

ABCD Bank has subscribed to the PDM of the present technology. The PDM first takes snapshots and structural information of the entry pages of authentic W belonging to ABCD Bank and stores them in a webpage database. The PDM crawls the Internet on a regular basis taking in URLs from the current Internet map and also picking them up from SPAM mails filtered out by email servers worldwide. The PDM constantly matches the visual and/or structural information of the crawled webpage with W. When the heuristics of PDM detect a positive match on any of the crawled site, it immediately notifies ABCD Bank.

While the particular system and methods have been illustrated and described in detail with the help of drawings and foregoing descriptions, such an illustration and description is to be considered as exemplary and not restrictive in character, and is to be understood that it is the presently preferred embodiments of the present technology and is thus representative of the subject matter which is broadly contemplated by the present technology, and that all changes and modifications that come within the spirit of the disclosure are desired to be protected.

The invention claimed is:

1. A processor controlled hybrid method for blocking identifying a phishing webpage, the method comprising:
capturing overall visual information and overall structural information about a webpage being browsed by a user, wherein capturing overall visual information includes capturing repeated snapshot images of the webpage;
comparing the overall visual information and the overall structural information of the webpage with overall visual information and overall structural information of a legitimate webpage or a phishing webpage stored in a webpage database;
calculating a measure of similarity;
assessing the measure on the basis of a pre-determined threshold; and
concluding the measure of similarity is above the pre-determined threshold thereby identifying a phishing webpage;
and blocking the phishing webpage, thereby blocking the phishing webpage.

2. The method of claim 1, further comprising scanning a priority list received from a priority crawling engine.

3. The method of claim 2, further comprising compiling, storing and updating the webpage database with a record for each webpage, each record comprising the overall visual information, the overall structural information, a Hypertext Transfer Protocol response of the webpage, and a tag record identification.

4. The method of claim 3, further comprising compiling, storing and updating the priority list.

5. The method of claim 4, wherein capturing overall visual information comprises:
rendering the webpage with a pre-defined fixed resolution to provide a rendered webpage;
customizing the rendered webpage into a pre-defined fixed format to provide a customized webpage; and
taking repeated snapshot images snapshot of the customized webpage.

6. The method of claim 5, wherein capturing overall structural information comprises extracting a source code of the webpage to provide an extracted source code.

7. The method of claim 6, further comprising representing the extracted source code in as a scalar or a vector or a combination thereof.

8. The method of claim 7, further comprising generating hybrid information.

9. The method of claim 8, wherein capturing overall visual information includes capturing an instant preview image.

10. The method of claim 9, wherein capturing overall structural information includes capturing a source code structure format.

11. The method of claim 10, wherein the source code is hypertext markup language.

12. The method of claim 11, further comprising generating combined information with a combined information generator.

13. A processor controlled hybrid method for blocking a phishing webpage, the method comprising:
scanning a priority list received from a priority crawling engine;
capturing overall visual information and overall structural information about a webpage being browsed by a user, wherein capturing overall visual information includes capturing an instant preview image and repeated snapshot images of the webpage;
comparing the overall visual information and the overall structural information of the webpage with overall visual information and overall structural information of a legitimate webpage or a phishing webpage stored in a webpage database;
generating combined information with a combined information generator;
calculating a measure of similarity;
assessing the measure on the basis of a pre-determined threshold;
concluding the measure of similarity is above the pre-determined threshold;
identifying a phishing webpage;
and blocking the phishing webpage, thereby blocking the phishing webpage.

14. The method of claim 13, further comprising compiling, storing and updating the priority list.

15. A processor driven hybrid method for blocking a phishing webpage, the method comprising:
developing and maintaining a webpage database, the webpage database comprising at least one of legitimate webpages, suspect webpages and phishing webpages;
capturing visual information and structural information about a webpage being browsed by a user;
comparing the visual information and the structural information of the webpage with visual information and structural information of the webpages in the webpage database; wherein capturing overall visual information includes capturing an instant preview image and repeated snapshot images of the webpage;
comparing the overall visual information and the overall structural information of the webpage with overall visual information and overall structural information of a legitimate webpage or a phishing webpage stored in the webpage database;
generating combined information with a combined information generator;
calculating a measure of similarity;
assessing the measure on the basis of a pre-determined threshold;
concluding the measure of similarity is above the pre-determined threshold; and
instructing a module to block the phishing webpage thereby blocking the phishing webpage.

16. The method of claim 15, wherein developing and maintaining the webpage database comprises:
automatically scanning the Internet for webpages;
capturing the visual information and the structural information about the webpages; and
storing the information about the webpages in the webpage database.

17. The method of claim 16, further comprising:
tagging a visited webpage with a unique identifier; and
storing the unique identifier in the webpage database.

18. The method of claim 17, wherein the unique identifier is contained within an e-mail.

19. The method of claim 18, wherein the unique identifier is contained within a cache of a web browser.

* * * * *